United States Patent [19]

Cincera

[11] 3,957,912
[45] May 18, 1976

[54] METHOD FOR PREPARATION OF ABS TYPE RESINS

[75] Inventor: David L. Cincera, East Longmeadow, Mass.

[73] Assignee: Monsanto Company, St. Louis, Mo.

[22] Filed: Dec. 26, 1973

[21] Appl. No.: 428,154

[52] U.S. Cl. ............................................ 260/880 R
[51] Int. Cl.² ....................... C08C 1/15; C08F 8/02; C08F 291/02
[58] Field of Search ............................... 260/880 R

[56] References Cited
UNITED STATES PATENTS

| | | | |
|---|---|---|---|
| 3,488,744 | 1/1970 | Nemphos et al. | 260/880 R |
| 3,576,910 | 4/1971 | Jastrzebski | 260/880 R |
| 3,851,014 | 11/1974 | Dalton | 260/880 R |
| 3,859,217 | 1/1975 | Holstead et al. | 210/523 |

*Primary Examiner*—Joseph L. Schofer
*Assistant Examiner*—F. R. Cervi
*Attorney, Agent, or Firm*—Joseph S. Nelson; Edward P. Grattan; James C. Logomasini

[57] ABSTRACT

A process for making ABS and related resins which involves grafting an alkadiene elastomer with styrene-type and/or acrylonitrile-type monomers by emulsion polymerization to produce a grafted rubber latex, mixing with such grafted latex a mixture of at least one of the same monoethylenically unsaturated monomers and at least one saturated styreneacrylonitrile copolymer solvent in an amount of at least 5 percent by weight of such saturated solvent based upon the total weight of monomers and solvent, coagulating the grafted rubber particles from the latex, separating water from said mixture and subjecting the resulting dispersion of grafter rubber in said solvent and monomer mixture to continuous mass polymerization.

21 Claims, No Drawings

METHOD FOR PREPARATION OF ABS TYPE RESINS

BACKGROUND

In the commercial production of rubber modified resins of the type wherein rubber particles of alkadiene rubber grafted with a styrene-type monomer and acrylonitrile-type monomer are generally uniformly dispersed in a matrix of a copolymer of styrene-type monomer and acrylonitrile-type monomer, which resins are sometimes termed ABS resins, it has heretofore been a common commercial practice to use either suspension or emulsion polymerization procedures for the preparation thereof. A given product resin is produced either as a result of a single batch polymerization or as a result of several batch polymerizations followed by a physical blending procedure involving mixing of preformed graft copolymers with other graft copolymers or with ungrafted copolymer. Because of the inherent cost, complexity and sensitivity associated with such manufacturing technology, the art has recently been attempting to develop different techniques which would permit one to manufacture such resins using cheaper, less complex, highly reliable procedures and equipment. A particularly promising different technique would involve the use of mass polymerization which avoids such problems as product separation and recovery from the water used for suspension or emulsion polymerization.

To prepare ABS resins by all-mass polymerization technology has been heretofore proposed, but the practical realization of such a manufacturing route on a commercial scale is full of problems because of the difficulties of producing a product resin which is cheap enough to be competitive and still has the necessary and desirable physical properties for molding and extruding and for formed, manufactured product applications. Because of these difficulties, the art would like to blend some of the mass polymerization technology with some of the emulsion and/or suspension technology in an overall process. So far as is presently known, however, the previously proposed hybrid routes involving such a mixture of polymerization technologies to make ABS type resins have generally not been commercialized for a variety of cost and product quality related reasons.

There has now been invented a new and very useful process for making ABS and other related resins which utilizes both mass or bulk polymerization and emulsion polymerization technologies. This new process involves grafting an alkadiene elastomer with a mixture of styrene-type and acrylonitrile-type monomers by emulsion polymerization techniques to produce a grafted rubber latex, mixing with such latex a mixture of at least one of the same monoethylenically unsaturated monomers and at least one saturated styrene-acrylonitrile copolymer solvent in an amount of at least 5 percent by weight of such saturated solvent based on the total weight of monomers and solvent, coagulating said grafted rubber particles, separating water from said mixture and subjecting the resulting dispersion of grafted rubber in said solvent and monomer mixture to mass or bulk polymerization.

The process of the present invention offers many advantages over the prior art. The monomer-solvent mixture serves to transfer the grafted rubber polymer into the organic solvent phase without substantially altering the size of the graft rubber particles and renders the water present in the latex emulsion largely separable from the dispersion of graft rubber particles in the monomer-solvent mixture. The mixed saturated solvent can be readily separated from the product of mass or bulk polymerization by devolatilization along with the unreacted alkenenitrile and monovinylidene aromatic monomers. Likewise such solvent can be recycled along with said recovered monomers to serve as additional dewatering solvent for fresh graft rubber latex in a continuous process.

SUMMARY

The preesent invention is adapted for utilization as part of a manufacturing process for making resins of the type where rubber particles of alkadiene rubber grafted with monovinylidene aromatic monomer and alkenenitrile monomer are generally uniformly dispersed in a matrix copolymer of monovinylidene aromatic monomer and alkenenitrile monomer. In the practice of this invention, the following steps are usually carried out. An alkadiene elastomer is grafted by means of an emulsion polymerization procedure with a monovinyladine aromatic monomer and an alkenenitrile monomer to produce a grafted rubber latex. This latex is then mixed with from 20 to 400 parts per 100 parts of latex solids by weight of a mixture of at least one monoethylenically unsaturated monovinylidene aromatic or alkenenitrile monomer and at least one saturated solvent for styrene/acrylonitrile copolymer in an amount of at least about 5 percent by weight of saturated solvent based on the total weight of solvent plus monomers. This monomer-solvent mixture can contain not more than 50 percent by weight of a monovinylidene aromatic monomer such as styrene. In order to provide good separation of water upon coagulation of the latex, the monomer-solvent mixture is added in an amount of saturated solvent plus alkenenitrile monomer such as acrylonitrile of 20 to 200 parts per hundred parts of latex solids by weight. Thus, depending upon whether a monovinylidene aromatic monomer such as styrene is present, the total monomer-solvent mixture added can range from 20 to 400 parts per hundred parts of latex solids by weight.

The graft rubber polymer particles in the latex are thus extracted into the mixture of monomer and saturated solvent upon such mixing and thereafter the water phase, comprising from 60 to 90 percent of the water present in the latex, is separated from the dispersion of graft rubber polymer particles in the monomer-solvent mixture. The resulting dispersion of graft rubber particles in the organic solvent phase is then subjected to mass or bulk polymerization procedures, and if required by the rubber level and matrix composition of the desired product, in the presence of additional unsaturated monovinylidene aromatic and/or alkenenitrile monomer in order to produce the final dispersion of rubber particles in copolymer matrix desired.

The graft rubber copolymer produced in the first step has a substrate of an alkadiene elastomer whose glass transition temperature is below 0°C, and preferably below about −20°C. The superstrate of this polymer is composed of monovinylidene aromatic monomer and alkenenitrile monomer copolymer graft polymerized thereon. This graft copolymer has a graft ratio of from about 5 to 75 parts by weight superstrate for each 100 parts of weight of substrate and a weight average particle size distribution in the range from about 0.01 to 5.0 microns and preferably from about 0.25 to 2.0 microns. It is generally produced by known emulsion polymerization procedures. Though any solids concentration in the water medium can be used in this process, it is generally produced in a concentration of from about 20 to 60 percent solids based on the weight of the latex.

The monomer-solvent mixture which is mixed therewith in the next succeeding step of the process comprises at least one monoethylenically unsaturated monomer which can be a monovinylidene aromatic monomer or alkenenitrile monomer, and a saturated solvent for the graft copolymer superstrate. Preferably such unsaturated monomer is styrene and/or acrylonitrile. The saturated organic solvent for the styrene/acrylonitrile superstrate of the graft polymer can be any such solvent boiling between about 25° to 250°C at atmospheric pressure. Preferably, such solvent is one boiling between about 35° and 180°C. Most preferably, the saturated solvent is a good to excellent solvent for the styrene/acrylonitrile superstrate portion of the graft rubber polymer while being a relatively poor solvent or swellant or preferably, a non-solvent for the alkadiene elastomer substrate thereof.

When the above monomer-solvent mixture is added to and mixed with the copolymer grafted rubber latex a rapid extraction of the graft rubber particles into the organic solvent mixture takes place. When such mixture of monomers and solvent does not result in an immediate or very rapid extraction and separation of the organic and water phases this can be accelerated by the addition to the mixture of a coagulating agent such as mineral salts, an acid, a polyelectrolyte or other known latex coagulant. With many selected monomer-solvent systems addition os a coagulant is unnecessary, but may be employed in order to facilitate complete extraction and phase transfer. Once the separation into discrete phases of (1) the organic monomer-solvent phase containing the graft rubber particles dispersed therein together with any styrene/acrylonitrile copolymer produced in the emulsion grafting process but not graft polymerized onto the alkadiene elastomer substrate, and (2) the water phase, sometimes containing some water-miscible saturated solvent, has taken place, then the water phase is separated from the organic phase. This separation, or dewatering, step can be carried out by any convenient means, including decanting, centrifuging, filtering or the like. Preferably, this water separation is carried out by some mechanical means which exerts pressure on the pasty fluid or semi-solid organic phase of concentrated graft rubber particle dispersion so as to separate the free water phase therefrom most efficiently.

Thereafter, the organic phase, usually in the form of a paste or semi-solid dispersion of graft rubber particles in the monomer-solvent mixture is generally mixed with or added to additional unsaturated monomer or monomers such as the monovinylidene aromatic monomer, the alkenenitrile monomer or, more usually a mixture thereof, and the resulting mixture mass or bulk polymerized to produce the desired graft rubber dispersion in polymer matrix resin product. This mass or bulk polymerization procedure can be carried out by conventional known means and is most preferably a mass thermal polymerization process.

The organic phase resulting from the mixing and extracting step outlined above and comprising a dispersion of graft rubber particles in the mixture of monomer-solvent comprises, on a 100 weight percent basis, from about 30 to 70 weight percent of graft rubber copolymer, from about 0.1 to 20 weight percent of uncombined or ungrafted second copolymer of monovinylidene aromatic monomer and alkenenitrile formed during the emulsion polymerization, from about 10 to 70 weight percent of the mixture of ethylenically unsaturated monomer and saturated solvent for the styrene/acrylonitrile superstrate and second copolymer and from about 0 to 40 weight percent of water. Such composition generally can range in form from a paste or semi-solid to a viscous fluid organic dispersion. This organic dispersion can also be described as psuedoplastic.

The composition of the mixture resulting after the usual admixing of the above dispersion with additional unsaturated monomers can be varied as required to produce, upon polymerization of the unsaturated monomers, a desired matrix copolymer composition with a desired rubber content ranging from about 5 to 35 weight percent rubber. This composition is thereafter subjected to mass or bulk polymerization procedures to produce a copolymer containing dispersed graft rubber particles, which copolymer is in solution in unreacted ethylenically unsaturated monomers. The mass polymerization is generally carred to a composition of from about 40 to 75 percent total solids, based on total organic constituents, i.e., only water present is not considered.

The copolymer solution there formed is then withdrawn from the mass polymerization reactor system, usually in the form of a hot melt and subsequently devolatilized to remove any water as well as to recover the unreacted monomers and solvents present. Thereafter, the devolatilized copolymer composition containing dispersed graft rubber particles is recovered as the desired final product, generally by stranding cooling, cutting or pelletizing and packaging.

PREFERRED EMBODIMENTS

As discussed above the production of ABS and related rubber modified resins requires the production of a copolymer grafted rubber from an initial rubber latex. For the purposes of the present invention, the graft rubber copolymer is produced by polymerizing the superstrate monomers in the presence of the preformed rubber substrate under emulsion conditions. In such a graft polymer system, it is generally not possible to separate any ungrafted rubber from the polymerized (grafted) rubber, and the amount of ungrafted rubber is usually very small, i.e., less than 2 percent, and preferably less than 0.5 percent, by weight based on total graft rubber copolymer weight. Also, since 100 percent grafting efficiency of superstrate monomers to rubber substrate normally is approached only at very low weight ratios of monomers to substrate at least a portion of the monomers polymerized in the presence of the preformed rubber substrate will not chemically combine therewith so as to provide a graft copolymer product. This noncombined copolymer superstrate portion may be increased or decreased depending upon the ratio of monomers to rubber, the particular monomer starting formulation, the nature of the rubber, the conditions of polymerization and the like, as those skilled in the art appreciate. Hence, a graft copolymer composition typically contains some amount of a second (ungrafted) copolymer of monovinylidene aromatic monomer and alkenenitrile monomer by reason of available methods of making a graft copolymer for use in the practice of the present invention. In general, any of the known emulsion graft polymerization processes may be used to accomplish graft polymerization of the superstrate monomers to the preformed elastomer alkadiene substrate. Such techniques are generally well known to those skilled in the art.

Various alkadiene rubbers may be employed as a substrate, including conjugated 1,3-diene rubbers, ethylenepropylen-diene terpolymer rubbers, acrylate-diene copolymer rubbers, and mixtures thereof. It is now preferred to include at least about 50 weight percent of a conjugated alkadiene component in an elastomer used to make starting compositions for use in this invention.

Preferred substrate rubbers are alkadiene rubbers or mixtures of alkadiene rubbers composed of at least 75 weight percent based on total rubber monomers, such as rubbery polymers having a second order transition temperature not higher than about 0°C., and preferably, not higher than about −20°C. Examples of such conjugated 1,3-dienes include butadiene, isoprene, piperylene, chloroprene, and the like. Such rubbers include hompolymers of conjugated 1,3-dienes and interpolymers of such 1,3-dienes with one or more copolymerizable monoethylenically unsaturated monomers, for example monovinylidene aromatic hydrocarbons such as styrene, and aralkyl styrenes, and the like; and alpha-alkyl-styrenes, such as alpha-methyl styrene, alpha-ethyl styrene, etc.; vinyl naphthalene, etc.; ar-halo monovinylidene aromatic hydrocarbons, such as the chlorostyrenes, 2,4-dibromo-styrene, etc.; acrylonitrile; methacrylonitrile; alkyl acrylates, and alkyl methacrylates, acrylamides, unsaturated ketones, such as vinyl methyl ketone, methyl isopropenyl ketone, etc.; alphaolefins such as ethylene, propylene, etc.; pyridines; vinyl esters, such as vinyl acetate, vinyl stearate, etc.; vinyl and vinylidene halides, and the like.

The rubber may contain up to about 2 percent of a cross-linking agent based on the weight of the rubber-forming monomer or monomers. The cross linking agent can be any of the agents conventionally employed for cross-linking diene rubbers e.g., divinyl benzene, diallyl maleate, diallyl fumarate, diallyl adipate, allyl acrylate, allyl methacrylate, diacrylates and dimethacrylates of polyhydric alcohols, e.g., ethylene glycol dimethacrylate, etc.

A preferred group of rubbers are those consisting of from about 75 to 100 percent by weight of alkadiene monomers and from about 0 to 25 percent by weight of a monomer selected from the group consisting of monovinylidene aromatic hydrocarbons, e.g., styrene and unsaturated nitriled, e.g., acrylonitrile, or mixtures thereof. Particularly advantageous rubber substrates are butadiene homopolymer or a copolymer of 90 to 95 percent by weight butadiene and 5 to 10 weight percent of acrylonitrile or styrene.

Emulsion polymerization is preferred over mass or suspension polymerization for polymerizing rubber monomers since such will provide a particle size which is preferred for use in the present invention. Furthermore, emulsion polymerization of rubber monomers produces a latex which is useful as a base or starting point for subsequent emulsion polymerization of the superstrate monomers onto the preformed rubber in the preparation of the graft rubber copolymer.

The graft copolymers may be prepared by polymerizing superstrate monomers in the presence of the preformed rubber substrate, generally in accordance with conventional emulsion graft polymerization techniques. The preferred processes use an emulsion technique to obtain the particle size of not more than about 0.8 microns for the graft copolymer which in preferred for use in the practice of the present invention. In such graft polymerization, a preformed rubber substrate latex generally is mixed with the desired monomers and this admixture is polymerized to combine chemically or graft a portion of the superstrate monomers upon the rubber substrate. Depending upon the ratio of monomers to rubber substrate and polymerization conditions, it is possible to regulate both the desired degree of grafting of the superstrate monomers onto the rubber substrate and the polymerization of ungrafted matrix copolymer. The ratio of monomers to rubber charged to the graft polymerization reaction zone is a primary determinant of the superstrate:substrate ratio of the resultant graft copolymer, although conditions of polymerization, rubber chemistry and particle size, rates of monomer addition, chain transfer agents, etc., may also exert an effect.

A polymerization catalyst is generally included and the amount used in generally within the range of from about 0.001 to 3.0 weight percent, and preferably from about 0.005 to 0.5 weight percent of the total polymerizable material, the exact amount depending upon the monomers and the desired polymerization cycle.

As is well known, it is often desirable to incorporate molecular weight regulators such as mercaptans, halides and terpenes in relatively small percentages by weight, on the order of from about 0.001 to 2.5 percenty by weight of the polymerizable material. In addition, it may be desirable to include relatively small amounts of antioxidants or stabilizers, such as the conventional alkylated phenols and the like, although these may be added during or after polymerization.

In the emulsion polymerization grafting process, the monomers and rubber substrate are stabilized in water by use of suitable emulsifying agents, such as fatty acid soaps, alkali metal or ammonium soaps of high molecular weight, alkali or alkaryl sulfates and sulfonates, mineral acid salts of long chain aliphatic amines, etc. Emulsifying agents which have proven particularly advantageous are ammonium oleate, sodium palmitate, sodium stearate, and other sodium soaps. Generally, the emulsifying agent is provided in amounts of from about 0.1 to 15 parts by weight per 100 parts by weight of the monomers, and water is provided in an amount of from about 1 to 4 parts per part of monomers, and even in larger ratios where greater dilution is desirable, all as thos skilled in the art appreciate.

If desired, an aqueous latex formed in the emulsion polymerization of the rubber substrate may provide the aqueous medium onto which the monomers are grafted, with or without the addition of further emulsifying agents, water, and the like. Various water soluble free radical polymerization initiators are conventionally used for emulsion polymerization of the rubber monomer, including conventional peroxy and azo catalysts, and the resulting latex may be used as the aqueous medium in which the graft copolymer monomers are admixed. In this manner, the catalyst for the rubber polymerization may function in whole or part as the catalyst for the graft polymerization. However, additional catalysts may be added at the time of graft polymerization.

Typical emulsion polymerization conditions involve temperatures in the range of from about 20° to 100°C with agitation, and preferably and inert atmosphere. Pressures of from about 1 to 100 pounds per square inch may be employed, and monomers and/or additional catalysts may be added incrementally or continuously over a portion of the reaction cycle. Polymerization is preferably continued until substantially all, that is more than 90 percent, of the monomers have polymerized. The remaining monomers and other volatile components can be distilled away from the latex, if desired, but preferably are allowed to remain in the latex, which is ready for further treatment.

In addition to varying the polymerization conditions, the particle size of the emulsion latex graft particles may also be varied by seeding, agitation, rubber size variation through agglomeration prior to grafting, coagulation techniques, etc. The preferred agglomeration procedures are provided by Dalton's US Pat. Nos. 3,558,541 and 3,551,370.

The particle size of the rubber has an effect upon the optimum grafting level for a graft copolymer. For example, a given weight percentage of smaller size rubber particles will provide considerably higher surface area for grafting than the equivalent weight of a larger size rubber particle. Accordingly, the density of grafting can be varied depending upon the size of the rubber particle. Generally, the smaller graft polymer particles will tolerate a higher superstrate/substrate ratio than the larger size particles.

The particle size of the rubber graft copolymer has a significant effect upon the gloss and physical properties of the product produced by the processes of this invention. Typically, the particle size of the graft copolymers used in the practice of the present invention may be varied from as little as about 0.01 micron to as much as about 5.0 microns, and preferably, from about 0.25 to 2.0 microns, depending upon the ultimate properties desired for a given product. Preferred rubber graft copolymers for use in the practice of this invention are those having a weight average particle size of from about 0.3 to 0.8 microns, and more preferably from about 0.3 to 0.6 microns as determined by known means such as measurement from a photomicrograph, light scattering or other known tests.

For emulsion polymerization processes, the rubber desirably has a significant degree of cross-linking. With respect to the graft copolymers, at least some degree of cross-linking of the rubber is inherent during the graft polymerization process, and this desirably may be augmented through the addition of cross-linking agents or control of the polymerization conditions.

Various ABS type resins may be produced by the process of this invention employing different starting graft rubber latices, mixtures of such latices or latices containing more than one size graft rubber particles. Examples of classes of ABS type resins producible by the teachings of this invention include resins having relatively monodisperse particle size distributions, resins having two particle sizes where one is a small particle and one is a large particle, resins where there is a graft particle component which is polydisperse in particle size distribution would be such that the weight average particle size ranges from about 0.01 to 5.0 microns, preferably from about 0.20 to about 2.0 microns, with the most preferred range being from 0.3 to 0.8 microns. Also, the rubber graft may be based on a low graft small particle rubber where the low graft particles cluster to form the large particles in the final polymer product.

For example, specifically useful latices and mixtures of latices include those of monodisperse relatively large size particles of from about 0.3 to 0.8 microns grafted to a graft superstrate level of from 30–80 parts per 100 parts substrate rubber wherein the particle size is monomodal and sharp, obtained by emulsion polymerization directly or by agglomeration to the desired size, and also polydisperse relatively larger size particles across a range of sizes from 0.3 to 0.8 microns grafted to the same graft level and obtained by emulsion polymerization and staged agglomeration to produce the polydispersity of sizes. Also, for example, such latices and mixtures include mixed latices of relatively large particle sizes of polydisperse size range as above but with a graft level of 15–40 parts per 100 parts substrate together with a latex of relatively small size, high graft level particles of from 0.05–0.3 microns and a graft level of 40–100 parts per 100 parts substrate, and mixed latices of a relatively large monodisperse particle of 0.3 to 2.0 microns and a low graft level of from 15–40 parts per 100 parts substrate together with the same high graft level, small size particle latex as above. Also, useful latex mixtures include, for example, those of mixed high graft level and low graft level small particles of 0.05 to 0.3 microns some with a graft level of 40–100 parts per 100 parts substrate and some with a graft level of only 10–40 parts per 100 parts substrate wherein the latex particles will agglomerate to a size of from 0.2 to 2.0 microns in the final ABS resin as a result of shear and working in the continuous mass polymerization reaction and devolatilization stages.

The graft rubber copolymer latex or mixture of latices containing ungrafted copolymer as described above is mixed with a mixed monomer and solvent extractant for the polymers. The mixing may be accomplished in any form and order of addition so long as the extractant and latex are thoroughly interdispersed. Preferably such mixing should be accomplished at relatively low shear rates. The monomer and solvent mixture comprises at least one monoethylenically unsaturated monovinylidene aromatic or alkenenitrile monomer and at least one saturated solvent, i.e. no unsaturated carbon atoms, for the monovinylidene aromatic/alkenenitrile graft copolymer superstrate and ungrafted copolymer. The mixed extractant contains at least about 5 percent by weight of such saturated solvent based on the total weight of such solvent plus monomers. Furthermore, to insure good water separation the monomer-solvent mixture can contain not more than 50 percent by weight of the monovinylidene aromatic monomer such as styrene. The extractant monomer-solvent mixture is used in an amount of from 20 to 200 parts of saturated solvent plus alkenenitrile monomer per hundred parts of latex solids by weight. Hence, if a monovinylidene aromatic monomer such as styrene is present the total monomer-solvent mixture added to and mixed with the graft rubber latex can range from 20 to 400 parts per hundred parts of latex solids by weight.

The monoethylenically unsaturated monomers useful in the monomer-solvent mixture are of the two general classes described above. When a typical ABS resin wherein the matrix resin is comprised of an acrylonitrile-styrene copolymer is desired then the most preferred monomers in the mixture are styrene and acrylonitrile. However, other monovinylidene aromatic monomers can be used in whole or in part in place of styrene, such as alpha-methyl styrene, alpha-ethyl styrene, vinyl naphthalene and the like. Likewise, other alkenenitrile monomers can be used in whole or in part in place of acrylonitrile, such as methacrylonitrile, 2-butenenitrile, 3-butenenitrile and the like. These monomers, if employed, in the monomer-solvent mixture will be present in the matrix resin as comonomers in the matrix copolymer. Since ABS resins are overwhelmingly composed of acrylonitrile-styrene copolymer matrices these monomers are the preferred ones of choice for use in the monomer-solvent mixture for extracting the graft rubber latices, and in this specification the present invention will be described in terms of styrene and acrylonitrile monomonomers. It is to be understood, however, that the above monomers can also be used if desired.

The saturated solvent used in the monomer-solvent mixture can be any such saturated solvent boiling between about 25° and 250°C. at atmospheric pressure and preferably between about 35° and 180°C. which is at least a partial solvent for the graft rubber copolymer superstrate. Preferably, such a solvent is both a good solvent for the styrene/acrylonitrile copolymer superstrate while at the same time a relatively poor solvent or non-solvent for the alkadiene rubber substrate. Saturated solvents for the graft copolymer superstrate which can be used in admixture with the monomer or monomers include nitriles such as acetonitrile, propionitrile, butyronitrile, methoxy propionitrile, benzonitrile, isobutyronitrile, acetone cyanohydrin and the like, ketones such as acetone, methyl ethyl ketone, methyl propyl ketone, methyl isobutylketone, cyclohexanone and the like, cyclic hydrocarbons such as benzene, ethyl benzene, toluene, xylenes, cyclohexane, methyl cyclohexane and the like, halogenated hydrocarbons such as chloroform, carbon tetrachloride, and the like, lower carboxylic esters such as methyl acetate, ethyl acetate, butyl acetate, Cellosolve acetate, and the like, cyclic ethers such as tetrahydrofuran and the like, carbonates such as diethyl carbonate, dipropyl carbonate, and the like, and formamides and acetamides such as dimethylformamide, diethylformamide, dimethylacetamide, and the like. The preferred saturated solvents are those selected from the nitriles and ketones detailed above, which represent the best balance of solvent and non-solvent properties respectively for the copolymer superstrate and alkadiene rubber substrate.

The improvements of the present invention are found when the monomer-solvent mixture contains at least 5 percent by weight of said mixture of at least one of the saturated SAN copolymer solvents. Preferably, such monomer-solvent mixture will contain from about 10 to about 40 percent by weight of such solvent. Most preferably, the solvent can range from about 20 to about 35 percent by weight.

Generally, when a considerable portion of the most preferred monomers are present in the monomer-solvent mixture used the graft rubber particle in the latex will be coagulated immediately or upon thorough mixing of the latex with the monomer-solvent mixture. However, it is usually preferred to speed up and insure completeness of such coagulation of the latex. This can be accomplished by gentle heating of the latex and monomer-solvent mixture or, preferably, by the addition thereto of known latex coagulants. Such coagulants found suitable include acids such as formic acid, acetic acid, propionic acid, acrylic and methacrylic acid, sulfuric acid and hydrochloric acid, salts such as aluminum sulfate, aluminum nitrate, sodium chloride, calcium nitrate, magnesium sulfate, lead nitrate and lead acetate, and polyelectrolytes such as polyethylene oxide of high molecular weight, polyacrylic acid, polyacrylates and polymethacrylates, polyalkyl glycols of high molecular weight such as polyethylene glycol 3,000 and the like as well as alginates and other natural polymers known as latex coagulants. The most preferred are those coagulants which are most completely removed upon separation and removal of the water from the latex.

The mixing of the monomer-solvent mixture and the graft rubber latex generally results in a rapid extraction of the graft rubber particles into the monomer-solvent mixture and an accompanying separation of the major proportion of the water present in the latex or added with any coagulant used. The use of a coagulant aids in achieving the most complete separation of this water into a separate phase. The graft rubber copolymer particles as well as any ungrafted SAN copolymer present in the latex is rapidly taken up into the monomer-solvent mixture phase wherein the graft rubber particles are present as a dispersion. In order to achieve rapid formation of the dispersed graft rubber in monomer-solvent mixture phase, an amount of monomer-solvent mixture of from about 20 to 400 parts of monomer-solvent mixture per 100 parts of latex solids, or from 20 to 200 parts of the total of alkenenitrile monomer-saturated solvent mixture per 100 parts of latex solids, is used. Preferably an amount of such monomer-solvent mixture from 50 to 300 parts when styrene is present, or from 50 to 150 parts of the acrylonitrile-saturated solvent mixture, per 100 parts of latex solids is employed. The mixing and extraction is generally carried out at ambient temperatures, but can be conducted at low to elevated temperatures of from about 0° to about 160°C; above about 80°C such extraction will preferably be carried out under pressure to prevent loss of monomers and solvents.

After the extraction of the graft rubber and SAN copolymer present into the monomer-solvent organic phase and formation of a separate water phase this latter water phase is separated from the organic phase. This separation or dewatering step can be carried out by any convenient means including centrifuging, decanting, filtering, or the like. Preferably, for use in a continuous process the water separation is carried out by a mechanical means which exerts pressure on the pasty or semi-solid organic phase so as to separate the water most efficiently and completely. One such suitable means is the screw separator disclosed in the copending application of R. D. Holstead and C. E. Wyman, U.S. Pat. Ser. No. 323,470 filed Jan. 15, 1973. Other mechanical means of exerting pressure upon the pasty organic and water mass may also be employed to remove the separate water phase from the organic phase. Generally, by such means one is able to separate and remove from 60 to 90 percent of the water present in the latex mixed with the monomer-solvent mixture. The most complete removal of such water at this stage is desirable in order to decrease the amount which must be removed in later stages of the process such as polymerization or devolatilization.

The organic phase which results from the extraction of graft rubber copolymer and separation of the free water phase comprises a dispersion of graft rubber copolymer particles in the monomer-solvent mixture. This organic dispersion is in the form of a viscous fluid, paste or semi-solid. It may also be described as psuedoplastic. In order for this organic dispersion to be polymerized in a continuous mass polymerization it must be capable of being continuously pumped for desired handling and transfer. Therefore, the viscosity of the organic dispersion will control, to an extent, the efficiency of such mass polymerization processes. If the viscosity is too high, pumps to develop a very high pressure will be required to effect transfer and, also, the danger of forming immoval plugs in the transfer lines will arise. On the other hand, if of too low viscosity, the separation of a free water phase may be hindered, or different equipment may be required for the separation. A distinct advantage of the present process resides in the ability to control and predetermine the range of viscosity of such organic dispersion paste at a desired level by selection of specific saturated organic solvents and amounts thereof to be used in the monomer-solvent mixture. Likewise, optimum levels of water removed can be simultaneously maintained by such selection of solvents and amounts thereof. In general, it has been found desirable to produce an organic dispersion having a viscosity ranging from about 3,000 to 100,000 cps. For optimum dewatering in the screw separator described the dispersion desirably has a viscosity of 50,000 to 80,000 cps. Preferably, for further transfer and treatment such dispersion will have a viscosity of from about 15,000 to 50,000 cps, which can be realized by addition of monomers and/or solvent to the dewatered dispersion, as detailed below. An organic dispersion having a viscosity within the above range is easily and efficiently transferred by pumping with none of the attendant disadvantages of a very high viscosity material.

The organic dispersion of graft rubber particles in monomer-solvent mixture can be submitted to mass polymerization, preferably a mass thermal polymerization, without the addition of additional unsaturated monomer if a product resin of very high rubber content as great as about 40 percent by weight is desired. However, it is generally preferred to add to and mix with the organic dispersion additional unsaturated monomer or monomers prior to carrying out the bulk or mass polymerization of the monomers present. Preferably and generally such added monomers are styrene or acrylonitrile or mixtures thereof. The addition to the organic dispersion can be made in any desired manner such as into a transfer line, into a separate vessel or, preferably, directly into a polymerization reactor.

The mass polymerization of the organic dispersion with or without added monomers is carried out in known manner by employing any known mass polymerization reaction equipment on vessels. Preferably, such mass polymerization is a thermal polymerization conducted in any of the known polymerization vessels adapted for removal of the unreacted monomers and solvents in vapor form. Most preferably, the thermal mass polymerization reaction is conducted with close control of the reaction temperature by means of removal of the monomer vapor from the reaction vessel. Any temperature controlled polymerization reaction equipment from which monomer vapor can be removed can be employed for the preferred mass polymerization step including stirred tank reactors, horizontal stirred cylindrical reactors, and other such reactors.

During the mass polymerization the saturated organic solvents present in the monomer-solvent mixture are removed along with unreacted monomers in vapor form. These vapors are then condensed and may, if desired, be subjected to distillation processes for separation of a part or all of the saturated solvents present from the condensed monomers. Most desirably, however, the entire condensate of monomers and solvents, after separation of any water, returned as reflux to the polymerization vessel. During the mass polymerization any water remaining in the organic dispersion phase will likewise be removed along with the monomer and saturated solvents in vapor form and will be condensed therewith. Generally, this condensed water will form a separate phase which can be decanted or drawn off from the monomers and solvents present prior to their reflux to the polymerization vessel or recycle for further use. However, this water can be separated by distillation if the nature of the solvents or monomers present makes it desirable.

The mass polymerization reaction can be controlled by varying the nature and amounts of the feed streams thereto and the conditions thereof to produce the desired ABS resin product. As is well known, it is often desirable to incorporate molecular weight regulators or chain transfer agents into the polymerization of the matrix copolymer in relatively small quantities. Such chain transfer agents as mercaptans, halides and terpenes can be added in amounts of from 0.001 to 2.0 percent by weight if desired. The product will consist of a desired matrix copolymer of selected composition, preferably styrene-acrylonitrile, or SAN, copolymer and a dispersion therein of graft rubber particles to produce the desired rubber content. Resins having a rubber content of from 5 to 35 or higher weight percent rubber in the copolymer matrix can be produced. The mass polymerization reaction can be controlled to produce a copolymer solution in unreacted monomers of any desired composition, preferably from about 40 to 75 percent by weight copolymer solids in unreacted monomers. The product of the preferred thermal mass polymerization reaction in generally in the form of a hot melt of such composition at a temperature of from about 130° to 200°C. depending upon the polymerization temperature conditions.

The hot melt product of mass polymerization is continuously removed from the reactor and thereafter subjected to one or more stages of devolatilization to remove the remaining unreacted monomers and saturated solvent and remaining traces of water therefrom. Such devolatilization is conducted in known manner in any desired devolatilizer, either of the wiped film or falling strand type. The devolatilization treatment is generally conducted at temperatures of from about 140° to 280°C at reduced pressures of from 0.01 to 800 mmHg absolute, preferably at from about 180° to 260°C and at pressures of from 2 to 200 mm abs. The product of the devolatization stage is the resin product composition substantially freed of free or unreacted monomers as well as solvent and water. Such free or residual monomer level is reduced to less than 1.0 percent by weight and desirably to less than 0.4 percent by weight.

The unreacted monomers, solvent and water are removed from the polymer resin melt in vapor form by the devolatilization. These vapors are generally condensed and recovered for reuse. The condensed liquids may be separated into a monomer and a solvent stream and a water stream for discard, if desired. It is preferred, however, to recycle the entire condensate of monomers and solvents, with or without separation of the condensed water, for reuse as monomer-solvent mixture for extraction and dewatering of additional graft rubber latices in a continuous or semi-continuous process. Depending upon the selection of the saturated organic solvent or solvents, the desired monomer-solvent mixture can be reconstituted by the addition of fresh monomers, preferably styrene and/or acrylonitrile, and, under certain circumstances, of additional saturated solvents. If a highly water-miscible solvent is used losses thereof in the water phase, is separated, may require addition of such solvent to reconstitute the desired monomer-solvent mixture for extraction and dewatering. Consequently, it is often preferable to recycle the entire devolatilization condensate, including water condensed therewith, to minimize loss of such water-miscible solvents, and this has been found to be a suitable procedure which is not detrimental to the extraction and dewatering steps.

After removal of the devolatilized resin product from the devolatilization stage generally in the form of a melt it is formed into strands or other shapes by the use of stranding dies or other conventional means and thereafter cooled, cut or pelleted into the desired final size and stored or packaged for shipment. The final operations can all be conducted in conventional manner through the use of known equipment and devices.

The practice of the present invention is illustrated by reference to the following examples wherein all parts are by weight unless otherwise indicated.

EXAMPLE IA

Various ratios of styrene monomer and acetonitrile solvent were employed as monomer-solvent mixtures for dewatering a coagulated blend of grafted rubber particles at different temperatures. The starting latex consisted of a blend of 40 parts of a 0.68 micron graft rubber having 20 parts of SAN copolymer superstrate grafted per 100 parts of a 97% butadiene/3% styrene rubber and 60 parts of a 0.28 micron graft of the same rubber having 50 parts of SAN copolymer superstrate grafted per 100 parts of rubber, both superstrates simultaneously grafted by emulsion polymerization with 40 parts per 100 parts rubber of a 70/30 mixture of styrene/acrylonitrile. The solids content of the latex was 35% by weight. This latex was diluted with water, coagulated by addition of about 3 parts by weight per part of latex of a 2% aqueous solution of $MgSO_4$, and the free water centrifuged off to yield a wet crumb of 37.8% solids.

The addition of styrene ranged from 10 to 40% of an assumed total monomer-solvent mixture for mass polymerization while the addition of acetonitrile ranged from 10 to 30% thereof. The procedure involved addition of a weighed amount of acetonitrile to a 50 g. sample of the coagulated wet crumb and then the addition of a weighed amount of styrene with stirring to produce a uniform dispersion. When stirring was stopped two phases were generally formed with a water phase visible as descrete drops. Any free water phase which formed was decanted from the monomer-solvent plus rubber paste.

Twenty gram samples of the monomer-solvent dispersion or paste were centrifuged at 4,000 RPM for 5 minutes and the volume and weight of the separated water phase, including any decanted, was measured. The percent of the initial water present separated was determined. The results are set out in Table 1A below.

TABLE IA

| Run | Solvent Added, g. Styrene | ACN | From 20 g. Dispersion Total $H_2O$ Removed, g. | % $H_2O$ Removed |
|---|---|---|---|---|
| At 25°C Temp | | | | |
| 1 | 8.3 | 9.6 | 19.5 | 62.7 |
| 2 | 8.3 | 19.2 | 19.2 | 61.7 |
| 3 | 8.3 | 28.7 | 24.8 | 79.7 |
| 4 | 16.5 | 9.6 | 9.3 | 29.9 |
| 5 | 16.5 | 19.2 | 15.9 | 51.1 |
| 6 | 16.5 | 28.7 | 22.9 | 73.6 |
| 7 | 24.8 | 9.6 | 17.8 | 57.2 |
| 8 | 24.8 | 19.2 | 13.9 | 44.7 |
| 9 | 24.8 | 28.7 | 20.9 | 67.2 |
| 10 | 33.1 | 9.6 | 0 | 0 |
| 11 | 33.1 | 19.2 | 4.2 | 13.5 |
| 12 | 33.1 | 28.7 | 14.7 | 47.3 |
| At 65°C Temp | | | | |
| 13 | 8.3 | 9.6 | 13.6 | 43.7 |
| 14 | 8.3 | 19.2 | 13.1 | 47.1 |
| 15 | 8.3 | 28.7 | 18.3 | 58.8 |
| 16 | 16.5 | 9.6 | 12.3 | 39.5 |
| 17 | 16.5 | 19.2 | 16.0 | 51.4 |
| 18 | 16.5 | 28.7 | 18.3 | 58.8 |
| 19 | 24.8 | 9.6 | 14.1 | 45.3 |
| 20 | 24.8 | 19.2 | 10.8 | 34.7 |
| 21 | 24.8 | 28.7 | 13.3 | 42.8 |
| 22 | 33.1 | 9.6 | 8.1 | 26.0 |
| 23 | 33.1 | 19.2 | 7.4 | 23.8 |
| 24 | 33.1 | 28.7 | 6.0 | 19.3 |

EXAMPLE IB

The above experiment was repeated employing the same blended graft rubber latex of 35% solids by weight which has no coagulant added in place of the coagulated wet crumb above. In this case there were used from 40 to 70 ml. of acetonitrile as a first addition to 100 gram samples of the latex and successive 5 ml. portions of styrene until a clear water phase appeared. The latex dispersion was stirred with a turbine agitator. When stirring was stopped the separate water phase was decanted from the dispersion of graft rubber in monomer-solvent mixture, and the amounts of such water phase removed and of the remaining monomer-solvent phase were measured. The physical apperance of the monomer-solvent plus graft rubber phase was recorded and the results are set out in Table IB below.

TABLE IB

| Solvent ACN, ml. | Styrene ml. | Monomer/ Solvent Appearance | Phase Wt. g. | % ACN In Phase | $H_2O$ Removed g. | % |
|---|---|---|---|---|---|---|
| 70 | 15 | Fluid | 80 | 30.8 | 50.5 | 78 |
| 50 | 20 | Paste Lump | 84 | 25.9 | 55 | 84 |
| 60 | | Fluid | 86 | 27.5 | 54 | 84 |
| 40 | 25 | Paste Lump | 92 | 22.6 | 48 | 74 |

EXAMPLE II

The above experiment was repeated employing the same graft rubber latex as described above and a mixture of acetone and acrylonitrile as dewatering solvent/monomer. In this case, there were used mixtures of from 20 to 56 ml. of acetone and from 10 to 30 ml. of acrylonitrile per 100 g. samples of the latex with the addition of styrene monomer indicated below. The latex dispersion was agitated as in Example II, the water phase was decanted and measured, and the results are recorded in Table 2 below. In every sample the monomer-solvent and graft rubber dispersion formed a relatively fluid paste phase.

TABLE 2

| Solvent, ml. Acetone | AN | Styrene, ml. | Water phase ml. | % Acetone | % Water Removed |
|---|---|---|---|---|---|
| 40 | 10 | 20 | 62 | 19.5 | 69 |
| 56 | 14 | 20 | 80 | 31 | 74 |
| 30 | 20 | 5 | 72 | 19 | 75 |
| 20 | 30 | 0 | 62 | 16 | 68 |

EXAMPLE III

A series of saturated solvents were employed to dewater a latex together with mixtures of styrene and acrylonitrile monomers in the approximate ratio which such monomers would bear in a feed stream to a mass polymerization reaction to product SAN matrix copolymer. The latex used was a bimodal rubber particle of a 97% butadiene/3% acrylonitrile rubber emulsion grafted to 40 parts per 100 parts of rubber with a 70/30 styrene/acrylonitrile copolymer and containing two sizes of grafted rubber particles, one size of approximately 0.7 microns and one of approximately 0.3 microns. To 100 gram samples of this latex were added the various amounts indicated of the solvents listed in Table 2 as well as the indicated amounts of acrylonitrile and of a 60/40 mixture of styrene and acrylonitrile. The latter was designed to approximate the recovered monomer portion of a simulated recycle stream from devolatilization of an ABS copolymer resin. The experiment was designed to test the dewatering efficiency of monomer-solvent mixtures limited in the amounts of acrylonitrile to those present in a mass polymerization charge to produce a high, i.e. greater than 20% by weight, rubber level ABS resin. The water phase which separated upon addition of the monomers and solvents tested was decanted and measured. Likewise the amount of rubber particle losses with the separated water phase were determined. The results are set out in Table III below.

EXAMPLE IV

In this Example the ability to vary and adjust the viscosity of the dewatered paste monomer-solvent dispersion prior to mass polymerization by varying the proportions of monomer, solvent and latex is illustrated. The indicated amounts of the named solvents plus the indicated amounts of a 60/40 mixture of styrene/acrylonitrile monomers were employed as dewatering mixture. One hundred gram samples of the same latex as employed in Example III above were coagulated with 10 mls. of a 4% aqueous solution of $Al_2(SO_4)_3$. After addition of both solvent and monomers, separation of the organic and water phases occurred and the water phase was decanted. To samples of the dispersion produced there were added sufficient additional amounts of the above solvent-monomer mixture and/or a 70/30 mixture of styrene and acrylonitrile monomers to produce a 28, 23, 18 or 13% rubber content ABS resin upon mass polymerization thereof to at least a 65% solids content. The viscosity in centipoises of each such premix prior to reaction was determined on a Brookfield Viscosimeter at 6 RPM and is set out in Table 4A below.

TABLE 4A

| Solvent | Dewatering Mixture, g. Solvent | Dewatering Mixture, g. 60/40 S/AN | Additions, g. Dew Mix. | Additions, g. 70/30 S/AN | Product % R | Viscosity cps. |
|---|---|---|---|---|---|---|
| Propionitrile | 15 | 31 | — | 50 | 28 | >100,000 |
| " | " | " | — | 69 | 23 | 43,000 |
| " | " | " | — | 97 | 18 | 5,400 |
| " | " | " | — | 148 | 13 | 400 |
| " | 12 | 25 | 9 | 50 | 28 | 50,000 |
| " | 19.3 | 26.7 | — | 50 | 28 | 69,400 |
| " | 15.5 | 20 | 10.5 | 50 | 28 | 26,000 |
| Butyronitrile | 19.3 | 26.7 | — | 50 | 28 | >100,000 |
| " | 13.6 | 18.6 | 13.8 | 50 | 28 | 29,400 |
| " | 11.0 | 16 | 20 | 50 | 28 | 19,400 |
| B-Methoxy Propionitrile | 15 | 31 | — | 50 | 28 | >100,000 |
| " | " | " | — | 69 | 23 | 85,300 |
| " | " | " | — | 97 | 18 | 7,000 |

TABLE III

| Solvent | Latex Gr. | AN Grs. | Solvent Grs. | 60/40 S/AN Grs. | Water Off Mls. | Solids Losses % |
|---|---|---|---|---|---|---|
| None | 100 | 15 | — | 24 | 62 | .5 |
|  | 100 | 15 | — | 34 | 58 | .5 |
|  | 100 | 15 | — | 40 | 57 | .5 |
| Propionitrile | 100 | 15 | 7.7 | 16.3 | 63 | .5 |
|  | 100 | 0 | 30 | 0 | 70 | .5 |
| Acetone Cyanohydrin | 100 | 15 | 7.7 | 16.3 | 68 | 1–3 |
| Cellosolve | 100 | 5 | 13.6 | 20 | 64 | .5 |
| Acetate | 100 | 15 | 7.7 | 16.3 | 66 | .5 |
| Propylene Carbonate | 100 | 15 | 16.8 | 73.2 | 58 | .5 |
| Butyronitrile | 100 | 15 | 7.7 | 16.3 | 62 | .5 |
| Benzonitrile | 100 | 15 | 7.7 | 16.3 | 62 | .5 |
| Ethyl Acetate | 100 | 15 | 7.7 | 16.3 | 62 | .5 |
| B-Methoxy-Propionitrile | 100 | 15 | 7.7 | 16.3 | 66 | 1–3 |
|  | 100 | 10 | 7.7 | 16.3 | 68 | 1–3 |
|  | 100 | 10 | 16.8 | 23.2 | 65 | .5 |
|  | 100 | 10 | 13.6 | 20 | 68 | .5 |
|  | 100 | 5 | 13.6 | 20 | 70 | 1–3 |
|  | 100 | 0 | 20 | 20 | 73 | 1–3 |
|  | 100 | 5 | 20 | 20 | 69 | .5 |
|  | 100 | 0 | 18.6 | 20 | 67 | .5 |
| Dimethyl Formamide | 100 | 20 | 13.6 | 23.3 | 77 | .5 |
|  | 100 | 15 | 7.7 | 16.3 | 75 | 1–3 |
|  | 100 | 15 | 13.6 | 20 | 79 | .5 |
| Toluene | 100 | 15 | 7.7 | 20 | 55 | 1–3 |
| Acetonitrile | 100 | 15 | 7.7 | 16.3 | 66 | .5 |
| Chloroform | 100 | 15 | 7.7 | 16.3 | 60 | .5 |

TABLE 4A-continued

| Solvent | Dewatering Mixture, g. Solvent | Dewatering Mixture, g. 60/40 S/AN | Additions, g. Dew Mix. | Additions, g. 70/30 S/AN | Product % R | Viscosity cps. |
|---|---|---|---|---|---|---|
| | " | " | — | 148 | 13 | 500 |
| Methyl Ethyl Ketone | 15 | 31 | — | 50 | 28 | >100,000 |
| | " | " | — | 69 | 23 | >100,000 |

A similar experiment was conducted utilizing a variety of coagulants and the effect on viscosity of a reaction premix was determined. To 100 gram samples of the same latex as in Example III there was added the indicated amounts of five different aqueous coagulant solutions. Thereafter there were added to the coagulated latices 15 g. of propionitrile solvent and 31 g. of a 60/40 mixture of styrene and acrylonitrile. The water phase which formed was separated and measured. Losses of solids were very low for all samples, ranging from 0 to .3% by weight.

Thereafter to the monomer-solvent dispersion there was added sufficient of a 70/30 styrene/acrylonitrile mixture to produce a reaction premix containing the indicated percentages of rubber as described above. The viscosities in centipoises of the various premixes were determined on a Brookfield Viscosimeter at 6 RPM. The last sample used 19.3 g. of propionitrile and 26.7 g. of styrene/acrylonitrile in a 60/40 mixture but was subjected to the same treatment. The results are set out in Table 4B below.

TABLE 4B

| Coagulant Sol'n | Latex pH | Water Sep'd mls. | Rubber in Product,% | Viscosity cps |
|---|---|---|---|---|
| A. 10 ml. 4% $Al_2(SO_4)_3$ | 4.1 | 60 | 28 | >100,000 |
| | | | 23 | 43,100 |
| | | | 18 | 5,400 |
| | | | 13 | 400 |
| B. 5 ml. 25% PEO*+ 4 ml. 10% KOH | 7.1 | 58 | 23 | >100,000 |
| | | | 18 | 14,800 |
| C. 5 ml. 25% PEO*+5 ml 4% $Al_2(SO_4)_3$+4 ml. 10% KOH | 7.1 | 65 | 18 | 9,800 |
| D. 5 ml. 25% PEO*+5 ml. 4% $MgSO_4$+4 ml. 10% KOH | 7.1 | 62 | 28 | >100,000 |
| | | | 23 | >100,000 |
| | | | 18 | 35,000 |
| | | | 13 | 475 |
| E. 10 ml. 4% $MgSO_4$+4 ml. 10% KOH | 7.1 | 60 | 28 | 91,200 |
| | | | 23 | 31,400 |

*PEO is Polyethylene Oxide of approx. $4 \times 10^6$ M.W.

A similar experiment was conducted using one of the above coagulants but at different pH levels. In this experiment 100 gram samples of the same latex as in Example III adjusted to the indicated pH were coagulated with 10 ml. of a 4% aqueous solution of $Al_2(SO_4)_3$. There was then added to each coagulated latex sample 13.6 grams of butyronitrile solvent and 18.6 grams of a 60/40 mixture of styrene and acrylonitrile monomers. The water phase was separated and measured. Again solids losses were very low, i.e. less than 0.5% by weight. The viscosity of each monomer-solvent dispersion phase was determined as above and is set out in Table 4C below.

TABLE 4C

| Latex pH Adjustment | Water Sep'd mls. | Rubber in Product % | Viscosity cps |
|---|---|---|---|
| None, pH 4.0 | 61 | 28 | 29,400 |
| HCl added to pH 2.5 | 61 | 28 | 26,800 |
| KOH added to pH 7.0 | 67 | 28 | >100,00 |

EXAMPLE V

This example demonstrates the process of dewatering a grafted rubber latex with acetonitrile solvent and styrene monomer, followed by further addition of styrene and acrylonitrile monomers, and continuous bulk polymerization to form a finished ABS resin of 23% rubber content.

A 97/3 butadiene/acrylonitrile copolymer latex having particle sizes of 40% of .68 micron and 60% of .28 micron bimodal particles was grafted by emulsion graft polymerization at 80°C with 40 parts per 100 parts rubber of a 70/30 styrene/acrylonitrile monomer mixture. After the reaction had reached 96+% conversion a grafted rubber latex of 35% solids, 23.5% rubber, by weight was obtained. 40 pounds of the above latex together with 2.2 pounds of a 13.6% aqueous aluminum sulfate coagulant solution, 15.6 pounds of acetonitrile and 9.4 pounds of styrene monomer were charged to an agitated tank and stirred for 2–3 minutes. The agitation was stopped and the organic phase allowed to rise to the surface of the free water phase. The water phase was drained away and the organic phase was found to comprise:

| | | |
|---|---|---|
| 14 | lbs. | solids (graft rubber + SAN copolymer) |
| 6.9 | lbs. | water |
| 8.6 | lbs. | acetonitrile |
| 9.4 | lbs. | styrene |
| 38.9 | lbs. | total |

A reaction premix was formed by adding to the above paste 20.2 pounds of styrene and 15.2 pounds of acrylonitrile monomer.

The resulting feed mixture was then subjected to continuous mass polymerization to a 60% solids conversion at 143°C and a pressure of 91 psig in a continuous stirred reaction vessel operated at 65% fillage with the temperature controlled by vaporization and reflux of the monomers present.

The hot melt product of the continuous mass polymerization reactor was subjected to wiped film devolatilization to remove unreacted monomers and traces of solvent and water at 230°C under vacuum. This was followed by stranding, cooling and pelleting of the devolatilized melt to produce an ABS resin of 23% rubber content. The product resin possessed excellent properties for the usual used of such ABS resins.

EXAMPLE VI

This example demonstrates the process of dewatering a grafted rubber latex with butyronitrile, styrene and acrylonitrile using a procedure similar to that of Example V. In this case the solvent/monomer mixture used in dewatering the latex is identical, after removal of water, to that obtained from devolatilization of the continuous polymerization product, and hence the condenses mixture of solvent and unreacted monomers can be recycled to the dewatering step for further use.

The latex employed was a blend of the following two separately grafted latices: (1) 40% of a .63 micron 97/3 butadiene/acrylonitrile copolymer rubber grafted with 20 parts per 100 parts rubber of a 70/30 styrene/acrylonitrile copolymer by emulsion graft polymerization at 80°C, and (2) 60% of a 0.35 micron 97/3 butadiene/acrylonitrile copolymer rubber similarly grafted with 45 parts per 100 parts rubber of the 70/30 styrene/acrylonitrile copolymer. The blended latices had an average particle size of .46 microns and a solids content of 31% with 22.9% rubber.

The above blended latex was metered to a mechanical screw device for separating water phase from the organic paste phase along with a coagulant solution, butyronitrile solvent and styrene and acrylonitrile monomers at the rates shown below. The device employed was the screw separator disclosed and illustrated in copending application U.S. Pat. Ser. No. 323,470 of Holstead and Wyman.

|  | lbs./hr. |
|---|---|
| Latex | 18 |
| Butyronitrile | 1.8 (25% of solvent/monomer mixture) |
| Styrene | 2.7 (37.5% of solvent/monomer mixture) |
| Acrylonitrile | 2.7 (37.5% of solvent/monomer mixture) |
| 4% $Al_2(SO_4)_3$ Sol'n | |

After separation of the water phase by the screw separator the organic paste dispersion phase contained 4.12 lbs./hour of rubber and had the following composition in pounds per hour:

|  | lbs./hr. |
|---|---|
| Solids | 5.58 |
| Water | 1.83 |
| Butyronitrile | 1.6 |
| Styrene | 2.7 |
| Acrylonitrile | 2.1 |
| Total | 13.81 |

After separation of the above organic paste a reaction premix was prepared by batch blending 61.6 lbs. of the paste with 45.2 lbs. of styrene, 6.2 lbs. of butyronitrile and 28.2 lbs. of acrylonitrile. The blended premix had viscosity of 7,000 cps and contained 24.9 lbs. solids, 8.2 lbs. water and 108.1 lbs. of butyronitrile, styrene and acrylonitrile.

The above feed mixture was continuously mass polymerized to 60% solids coversion, excluding water, in a horizontal continuous stirred reaction vessel operated at 50% fillage of the type described in U.S. Pat. No. 3,751,010 of George A. Latinen at 154°C and 105 psig. The reactor melt was continuously discharged to a wiped film devolatilizer for separation of the residual water, solvent and unreacted monomers from the product. The devolatilization was conducted under vacuum at 230°C and the devolatilized product was stranded, cooled and pelleted to produce an ABS resin of 23% rubber content. The product ABS resin possessed excellent physical properties. The condensed liquid separated by the devolatilizer can be reused in the latex dewatering step, with or without separation of condensed water, without adjustment of the composition.

EXAMPLE VII

This example demonstrates the dewatering of a grafted rubber latex with propionitrile, styrene and acrylonitrile employing the same technique described in Example VI. The solvent/monomer composition used for dewatering was the same as that separated by the devolatilizer and condensed, and this condensate was suitable for reuse in the dewatering step.

The latex employed was the same as the blended latex described in Example VI and was dewatered in the same screw separator used therein. The feed metered to the screw separator was the same as described in Example VI except for the following solvent and monomer rates:

|  | lbs./hr. |  |
|---|---|---|
| Propionitrile | 1.35 | (25% of solvent/monomer mixture) |
| Styrene | 2.08 | (37.5% of solvent/monomer mixture) |
| Acrylonitrile | 2.07 | (37.5% of solvent/monomer mixture) |

After separation of the water phase by the screw separator the organic paste dispersion contained 4.12 pounds per hour of rubber and had the following composition:

|  | lbs./hr. |
|---|---|
| Solids | 5.58 |
| Water | 1.91 |
| Propionitrile | 1.1 |
| Styrene | 2.08 |
| Acrylonitrile | 1.5 |
| Total | 12.17 |

A reactor premix feed was prepared by batch blending 41 lbs. of the above paste with 36 lbs. of styrene, 6.3 lbs. of propionitrile and 23.4 lbs. of acrylonitrile. The blended premix feed had a viscosity of 2500 cps and contained 18.75 lbs. of solids, 6.4 lbs. water and 81.45 lbs. of propionitrile, styrene and acrylonitrile.

The above premix feed was then continuously mass polymerized to 60% solids, excluding water, in the same manner and in the same equipment used in Example VI at a temperature of 156°C and a pressure of 110 psig at 50% fillage of the reactor. The reactor product melt was devolatilized in the same manner as in Example VI to produce an ABS resin product possessed excellent physical properties.

What is claimed is:

1. A process for production of ABS resins wherein particles of an alkadiene rubber grafted with monovinylidene aromatic and alkenenitrile monomers are dispersed in a matrix copolymer of a monovinylidene aromatic monomer and an alkenenitrile monomer which comprises:

a. grafting by aqueous emulsion graft polymerization an alkadiene rubber with a monovinylidene aromatic monomer and an alkenenitrile monomer to produce grafted rubber particles in an aqueous latex,
b. mixing with said latex from 30 to 400 parts per hundred parts of latex solids by weight of a mixture of at least one monoethylenically unsaturated monomer selected from the group consisting of monovinylidene aromatic monomers and alkenenitrile monomers and at least one saturated solvent for styrene/acrylonitrile copolymer boiling between about 25° and 250°C. at atmospheric pressure in an amount of at least 5 percent by weight of said saturated solvent based on the total weight of solvent plus monomers and wherein said solvent-monomer mixture contains not more than 50 percent by weight of said monovinylidene aromatic monomer,
c. extracting said grafted rubber latex particles from said aqueous latex into the mixture of monomer and solvent forming a dispersion of said particles in the solvent-monomer phase, said aqueous latex forming a separate free water phase,
d. separating said free water phase from said solvent-monomer phase,
e. subjecting said grafted rubber particles dispersed in said solvent-monomer phase and additional monoethylenically unsaturated monomers to mass polymerization conditions to produce an ABS resin composition comprising said alkadiene grafted rubber particles dispersed in said matrix copolymer, unreacted monomers and solvent as a melt and
f. devolatilizing said ABS resin composition melt so as to remove said unreacted monomers and solvent, providing an ABS resin product comprising said matrix copolymer having said grafted rubber particles dispersed therein.

2. The process of claim 1 wherein the mixture of the monoethylenically unsaturated monomer and saturated solvent is mixed with said latex in an amount of from 30 to 200 parts per hundred parts of latex solids by weight.

3. The process of claim 1 wherein the monoethylenically unsaturated monomer in the solvent-monomer mixture is styrene.

4. The process of claim 1 wherein the monoethylenically unsaturated monomer in the solvent in the solvent-monomer mixture is acrylonitrile.

5. The process of claim 1 wherein the saturated solvent is acetonitrile.

6. The process of claim 1 wherein the saturated solvent is butyronitrile.

7. The process of claim 1 wherein the saturated solvent is propionitrile.

8. The process of claim 1 wherein the saturated solvent is $\beta$-methoxy propionitrile.

9. The process of claim 1 wherein the saturated solvent is methyl ethyl ketone.

10. The process of claim 1 wherein the monomer added is a mixture of styrene and acrylonitrile.

11. The process of claim 1 wherein said mass polymerization conditions are continuous mass polymerization conditions.

12. The process of claim 1 wherein said grafted rubber latex is coagulated prior to extraction into said solvent-monomer mixture.

13. The process of claim 1 wherein the volatiles separated by said devolatilization are condensed and recycled to form at least a part of said solvent-monomer mixture.

14. The process of claim 13 wherein said condensed volatiles are recycled after separation of condensed water therefrom.

15. The process of claim 13 wherein said condensed volatiles are recycled without separation of condensed water therefrom.

16. The process of claim 1 wherein the separation of the said free water phase is carried out in a mechanical separator which exerts pressure on the said dispersion phase.

17. The process of claim 16 wherein the separation of the said free water phase is carried out in a screw separator.

18. The process of claim 1 wherein said mass polymerization conditions include reaction in a horizontal continuous stirred reactor.

19. The process of claim 1 wherein said mass polymerization conditions include close control of the polymerization temperature by removal of monomer vapor from said polymerization.

20. The process of claim 1 wherein said mass polymerization conditions include a temperature of from about 130° to 200°C.

21. The process of claim 1 wherein the alkadiene elastomer is a butadiene copolymer grafted with styrene and acrylonitrile monomers, the solvent-monomer mixture contains from about 10 to about 40 percent of said solvent, a mixture of styrene and acrylonitrile is added to said dispersion prior to mass polymerization thereof and said mass polymerization conditions are continuous mass polymerizations conditions at a temperature of from about 130° to 200°C in a horizontal continuous stirred reactor with close control of the polymerization temperature by removal of monomer vapor therefrom.

* * * * *